(12) United States Patent
Zahrt et al.

(10) Patent No.: US 12,399,093 B2
(45) Date of Patent: Aug. 26, 2025

(54) TEST CHAMBER AND METHOD

(71) Applicant: Weiss Technik GmbH, Reiskirchen (DE)

(72) Inventors: Yannik Zahrt, Rabenau (DE); Felix Diehl, Laubach (DE)

(73) Assignee: WEISS TECHNIK GMBH, Reiskirchen (DE)

( * ) Notice: Subject to any disclaimer, the term of this patent is extended or adjusted under 35 U.S.C. 154(b) by 317 days.

(21) Appl. No.: 18/139,728

(22) Filed: Apr. 26, 2023

(65) Prior Publication Data
US 2023/0349797 A1   Nov. 2, 2023

(30) Foreign Application Priority Data
Apr. 28, 2022   (DE) .................... 10 2022 110 340.4

(51) Int. Cl.
*G01N 1/42*   (2006.01)
*G01M 3/04*   (2006.01)
*G01N 1/44*   (2006.01)

(52) U.S. Cl.
CPC ............. *G01N 1/42* (2013.01); *G01M 3/04* (2013.01); *G01N 1/44* (2013.01)

(58) Field of Classification Search
CPC .......... G01N 1/42; G01N 1/44; G01N 17/002; F24F 11/36; G01M 3/04; G01M 3/228; G01M 3/229; F25B 1/00
See application file for complete search history.

(56) References Cited

U.S. PATENT DOCUMENTS 5,564,980 A    10/1996 Becker
11,561,211 B2 *  1/2023 Reuschel ................ F25B 41/39
(Continued)

FOREIGN PATENT DOCUMENTS

AU    2014319714 A1 * 12/2015 ............ F24F 1/0059
CN      204234107 U  *  4/2015
(Continued)

*Primary Examiner* — Francis C Gray
(74) *Attorney, Agent, or Firm* — Yakov Sidorin; Quarles & Brady LLP

(57) ABSTRACT

The invention relates to a test chamber and to a method for operating a test chamber for conditioning air, in particular a temperature control chamber, a climate chamber or the like, the test chamber comprising a temperature-insulated test space, which can be sealed from an environment and serves to hold test material, and a temperature control device for controlling the temperature of the test space, the temperature control device being configured to establish a temperature in a temperature range of −50° C. to +180° C. within the test space, the temperature control device having a heating feature and a cooling feature with a cooling circuit with a refrigerant, a heat exchanger in the test space, a compressor, a condenser and an expansion member, the refrigerant being a hydrocarbon or a refrigerant mixture of hydrocarbons, the test chamber being provided with a machine room physically separated from the test space, the cooling circuit with the compressor being at least partially disposed in the machine room. The test chamber comprises a ventilation system having a detector with at least one gas sensor for detecting refrigerant in the test space, the ventilation system comprising a fan and an exhaust duct, the exhaust duct being connected to the test space in such a manner that the fan can transport air from the test space into the exhaust duct, the fan comprising a fan motor and a fan impeller, the fan motor being disposed in an air-tight enclosure, or the exhaust duct being connected to the test space and the machine room in such a manner that the one fan can transport air from the machine room and the test space into the exhaust duct.

22 Claims, 3 Drawing Sheets

(56) References Cited

U.S. PATENT DOCUMENTS

| | | | |
|---|---|---|---|
| 11,940,189 B2 * | 3/2024 | Taras | ............... F25B 13/00 |
| 2024/0191918 A1 * | 6/2024 | Taras | ............... F24F 13/10 |

FOREIGN PATENT DOCUMENTS

| | | | | |
|---|---|---|---|---|
| CN | 207067364 U | | 3/2018 | |
| CN | 108779941 A | * | 11/2018 | ............ C09K 5/041 |
| CN | 109459532 A | | 3/2019 | |
| EP | 0344397 A2 | | 12/1989 | |
| EP | 2317254 A2 | | 5/2011 | |
| FR | 2945610 A1 | * | 11/2010 | ........... F25B 49/027 |
| JP | 2017067385 A | | 4/2017 | |
| JP | 2018173250 A | | 11/2018 | |

\* cited by examiner

TEST CHAMBER AND METHOD

This patent application claims priority of the German Patent Application No. 10 2022 110 340.4 filed on Apr. 28, 2022, the disclosure of which is incorporated herein by reference.

The invention relates to a method and a test chamber for conditioning air, in particular a temperature control chamber, a climate chamber or the like, the test chamber comprising a temperature-insulated test space, which can be sealed from an environment and serves to hold test material, and a temperature control device for controlling the temperature of the test space, the temperature control device being configured to establish a temperature in a temperature range of −50° C. to +180° C. within the test space, the temperature control device having a heating feature and a cooling feature with a cooling circuit with a refrigerant, a heat exchanger in the test space, a compressor, a condenser and an expansion member, the refrigerant being a hydrocarbon or a refrigerant mixture of hydrocarbons, the test chamber being provided with a machine room physically separated from the test space, the cooling circuit with the compressor being at least partially disposed in the machine room.

Test chambers of this kind are typically used to test physical and/or chemical properties of objects, in particular devices. For instance, temperature test cabinets or climate test cabinets within which temperatures in a range of −50° C. to +180° C. can be set are known. Climate test cabinets additionally allow desired climatic conditions to be set, to which the device or the test material is then exposed for a defined period of time. The temperature of the test space holding the test material to be tested is typically controlled in a circulating-air duct within the test space. The circulating-air duct forms an air treatment space in the test space, in which heat exchangers for heating or cooling the air flowing through the circulating-air duct or the test space are disposed. A fan or a ventilator aspirates the air present in the test space and leads it to the respective heat exchangers in the circulating-air duct. In this manner, the temperature of the test material can be controlled or the test material can be exposed to a defined change in temperature. For example, a temperature can change between a maximum temperature and a minimum temperature of the test chamber during a test interval. Such a test chamber is known from EP 0 344 397 A2.

The refrigerant used in a cooling circuit should have a relatively low CO2 equivalent; i.e., a relative global warming potential (GWP) should be as low as possible in order to avoid indirect damage to the environment in case the refrigerant is released. As per statutory regulations, a refrigerant must not significantly contribute to the depletion of ozone in the atmosphere or to global warming. This means that essentially no fluorinated or chlorinated substances are to be used as refrigerants, which is why natural refrigerants, such as carbon dioxide (CO2), are an option. Such refrigerants with a low GWP are disadvantageous in that these refrigerants tend to have a significantly lower cold capacity in the temperature ranges relevant for a cooling circuit than refrigerants with a comparatively higher GWP. While it is also known for hydrocarbons to be used as refrigerants, they are disadvantageous in that they are highly flammable. Flammability refers to the refrigerant's property of reacting to ambient oxygen by releasing heat. A refrigerant is flammable in particular if it is classified in fire class C of European standard EN2 and DIN 378 classes A2, A2L and A3 in their latest versions as at the priority date. The use of a flammable refrigerant complicates filling, shipping and operation of a cooling circuit and a test chamber because of the safety regulations that may have to be observed. A possible leakage of the cooling circuit within the test space is a significant problem since electrical resistance heaters and other electrically operated devices may be located in the test space as the test material. Hence, an explosion may occur in the event of a leak.

In order to exploit the advantages of flammable refrigerants compared to non-flammable refrigerants, however, it is necessary to prevent a potential explosion in the test space in the event of a leak. As in other comparable installations, this could be made possible by a ventilation system, which could be used to suction leaking refrigerant out of the test space. For this purpose, however, the ventilation system has to be suitable for use in an explosive atmosphere. Devices and protection systems complying with the ATEX directives of the European Union, in particular ATEX equipment directive 2014/34/EU and/or ATEX workplace directive 1999/92/EC in their latest versions as at the priority date, are considered suitable in this regard. However, there is the problem that temperatures of −50° C. to +180° C. may prevail in the test space depending on the text cycle while fans compliant with ATEX, which would be required for such a ventilation system, are not suitable for a use at these temperatures. A fan configured specifically for this use, on the other hand, would not be economical in production, development and a required ATEX certification because of the small number of units.

Hence, the object of the present invention is to propose a test chamber and a method for conditioning air using a test chamber which allow a test space atmosphere to be suctioned off by simple means under explosion-proof conditions.

This object is attained by a test chamber having the features of claim 1 or 7 and a method having the features of claim 19 or 20.

The test chamber according to the invention for conditioning air, in particular a temperature control chamber, a climate chamber or the like, comprises a temperature-insulated test space, which can be sealed from an environment and serves to hold test material, and a temperature control device for controlling the temperature of the test space, the temperature control device being configured to establish a temperature in a temperature range of −50° C. to +180° C. within the test space, the temperature control device having a heating feature and a cooling feature with a cooling circuit with a refrigerant, a heat exchanger in the test space, a compressor, a condenser and an expansion member, the refrigerant being a hydrocarbon or a refrigerant mixture of hydrocarbons, the test chamber being provided with a machine room physically separated from the test space, the cooling circuit with the compressor being at least partially disposed in the machine room, wherein the test chamber comprises a ventilation system having a detector with at least one gas sensor for detecting refrigerant in the test space, the ventilation system comprising a fan and an exhaust duct, the exhaust duct being connected to the test space in such a manner that the fan can transport air from the test space into the exhaust duct, the fan comprising a fan motor and a fan impeller, the fan motor being disposed in an air-tight enclosure.

The test chamber according to the invention allows a hydrocarbon or a refrigerant mixture of hydrocarbons to be safely used as a refrigerant in the cooling circuit, thus making it possible to exploit the advantages of this type of refrigerants. In the course of a test cycle, higher temperatures are established in the test space, the heating feature also heating the air of the test space. At the same time, the refrigerant contained in the heat exchanger is heated, which leads to a thermal expansion of the refrigerant in the heat exchanger. In the event of a leak, in particular of the heat exchanger in the test space, this means that refrigerant can easily escape into the test space. Since air is typically present in the test space, an explosive atmosphere can easily form as a result, which can lead to an explosion in connection with a possibly operational electrical resistance heating element of the heating feature, for example. To prevent this, a ventilation system of the test chamber is provided, which can suction air out of the test space. The ventilation system comprises the detector with the gas sensor for detecting refrigerant and/or detecting refrigerants used in the cooling circuit. The gas sensor is disposed directly in the test space, on the test space, connected to the test space or attached to the test space in such a manner that escaped refrigerant in the test space can be detected quickly. Furthermore, the exhaust duct is connected to the test space with the result that the fan can transport the air from the test space into the exhaust duct and thus out of test space.

Make-up air from an environment can flow into the test space through an opening, such as a pressure compensation device or an air supply duct, provided in the test space for this very purpose. The fan itself is composed of a fan motor and a fan impeller, the fan motor being disposed in an air-tight enclosure. This enables the use of fan motors not conforming to ATEX. Overall, the ventilation system can be equipped for use under explosive conditions by simple means in this manner.

The enclosure can be made of metal or sheet metal and separate the fan motor at least from the exhaust duct, the test space and/or the machine room in an air-tight manner. Consequently, the fan can be disposed in the test space or in the machine room; preferably, the fan is disposed in the machine room since this means that the fan is not exposed to the test conditions in the test space. Also, this prevents refrigerant potentially leaking into the test space from reaching the fan motor of the fan.

An exhaust air temperature in the exhaust duct can therefore approximately correspond to the temperature within the test space. The fan motor can be configured in such a manner that the fan can also transport air of +180° C., for example. The air-tight enclosure of the fan motor allows the fan motor to be shielded from hot plumes of air transported in the exhaust duct or air located in the area of the fan motor. A use of an ATEX-certified fan motor or fan, on the other hand, would not be possible in this case since these devices are typically certified for a transport medium temperature of −20° C. to +60° C., which would not fall cover the temperature in the temperature range of −50° C. to +180° C. established in the test space.

The exhaust duct can be connected to the teste space via a first duct section and to the machine room via a second duct section; the fan can be disposed in the first duct section, and another fan of the ventilation system can be disposed in the other duct section. For instance, it may also be provided for another gas sensor, which would be disposed in the machine room, to be configured to detect refrigerant in the machine room.

In this case, the other fan can suction air out of the machine room. To this end, the other duct section can be provided, in which the other fan is then disposed. Thus, it becomes possible for air to be suction out of the test space or the machine room independently or from the test space and the machine room simultaneously in the event of a leak so as to prevent the formation of an explosive atmosphere.

The first duct section and the second duct section can end in a common duct section of the exhaust duct. In this case, the common duct section can run outside of the test chamber or a housing of the test chamber or the machine room. Thus, it can be ensured that no pressurized exhaust ducts are disposed within the machine room. In this case, a potential explosive mixture of air and refrigerant is located in the common duct section outside the test chamber.

The other fan can be configured for use in explosive atmospheres, in particular according to the ATEX equipment directive and/or the ATEX workplace directive. Since an air temperature in the machine room essentially corresponds to an air temperature of an environment or is only slightly higher, an ATEX-certified fan or fan motor can also be used for ventilating the machine room.

Alternatively, the test chamber according to the invention for conditioning air, in particular a temperature control chamber, a climate chamber or the like, comprises a temperature-insulated test space, which can be sealed from an environment and serves to hold test material, and a temperature control device for controlling the temperature of the test space, the temperature control device being configured to establish a temperature in a temperature range of −50° C. to +180° C. within the test space, the temperature control device having a heating feature and a cooling feature with a cooling circuit with a refrigerant, a heat exchanger in the test space, a compressor, a condenser and an expansion member, the refrigerant being a hydrocarbon or a refrigerant mixture of hydrocarbons, the test chamber being provided with a machine room physically separated from the test space, the cooling circuit with the compressor being at least partially disposed in the machine room, wherein the test chamber comprises a ventilation system having a detector with at least one gas sensor for detecting refrigerant in the test space, the ventilation system comprising a fan and an exhaust duct, the exhaust duct being connected to the test space and the machine room in such a manner that the one fan can transport air from the machine room and the test space into the exhaust duct.

The test chamber according to the invention also allows ventilating the test space by means of the ventilation system when the gas sensor detects a refrigerant or the refrigerant used in the cooling system in the test space. Since the exhaust duct is connected to the test space and the machine room, operating the fans transports air from the machine room and the test space into the exhaust duct. As a result, air from the test space and air from the machine room mix with each other. In the machine room, the air located therein has a temperature which approximately corresponds to an air temperature of an environment or is slightly higher. By mixing the air from the machine room and the air from the test space, air from the test space, which has a very different temperature of −50° C. or +180° C., for example, can be mixed with air from the machine room until the air in the exhaust duct reaches a temperature which does not require for the fan to be configured for extreme temperatures. Since the exhaust duct is connected to the test space and the machine room and a common fan is used for the test space and the machine room, it becomes possible for air to be suctioned off under explosion-proof conditions by simple means.

For instance, the fan can be configured for use in explosive atmospheres, in particular according to the ATEX equipment directive and/or the ATEX workplace directive. Since moderate temperatures can be established in the exhaust duct by mixing the air of the test space and the machine room, an ATEX-certified fan with a usable temperature range between −20° C. and +60° C. can be used. This makes the ventilation system particularly cost effective and simple to produce.

The exhaust duct can be connected to the test space via a first duct section and to the machine room via a second duct section, and the first duct section and the second duct section can end in a common duct section of the exhaust duct, in which case the fan can be disposed in the common duct section. For instance, the first duct section and the second duct section can merge in the common duct section upstream of the fan. The common duct section can also leave a housing of the test chamber or leave the machine room directly downstream of the fan with the result that a potentially explosive mixture of air and refrigerant is located in the common duct section outside the test chamber.

The ventilation system can have an adjustment valve disposed in the first duct section. The adjustment valve allows an amount of air suctioned out of the test space when operating the fan to be mixed in a controlled manner with an amount of air suctioned out of the machine room. These amounts can be mixed in a ratio ensuring that temperatures above +60° C. and below −20° C. are not reached at the fan. The adjustment valve can be a simple flap or gate in the first duct section. Preferably, the adjustment valve is configured in such a manner that a volumetric flow rate in the first duct section can be varied as needed.

The ventilation system can have at least one sensor, which can be disposed in the first duct section, the second duct section and/or the air supply duct of the ventilation system, the air supply duct being connected to the test space; the sensor can be a flow sensor and/or a temperature sensor. As a result, a volumetric flow rate and/or a temperature of the air in the duct section in question can be determined. Based on the volumetric flow rate and the temperature, the air of the test space and the machine room can be mixed as needed in order to achieve an intended air temperature in the common duct section or the exhaust duct. Thus, the ventilation system is also basically independent of an operation of the test chamber or the temperature control device for the test space since the ventilation system has its own sensors. However, it would also be possible to connect the ventilation system to the temperature control device in such a manner that an air temperature of the test space measured by the temperature control device is processed by the ventilation system.

The test chamber can have a controller by means of which an exhaust air temperature in the common duct section can be controlled in a temperature range of −20° C. to +60° C. The controller can be configured in such a manner that air from the test space and air from the machine room is mixed to that effect. The mixture can be controlled by means of an adjustment valve controllable by the controller; temperatures and/or volumetric flow rates of the respective amounts of air can be determined by means of sensors.

Advantageously, the fan can be disposed within the machine room. Since an ATEX-conforming fan can be used, it can be disposed in the machine room. Thus, the ventilation system can be largely formed within a housing of the test chamber. In principle, however, the fan can also be disposed outside of the machine room.

The ventilation system can have an air supply duct, which can be connected to the test space; at least one valve can be disposed both in the air supply duct and in the exhaust duct, preferably directly upstream and downstream of the test space. The air supply duct can connect the test space to an environment. In this case, fresh air from the environment can flow into the test space via the air supply duct when the fan suctions air out of the test space. In order to prevent air from freely flowing through the test space when no fan is in operation, respective vales can be disposed in the air supply duct and the exhaust duct or in a first duct section of the exhaust duct, if present.

The valve can be at least one flap operable by a difference in pressure. The valves can each be formed by simple flaps. The flaps can be what is referred to as pendulum flaps, which open automatically when a pressure gradient is formed, for example, by the fan.

The detector can comprise at least one other gas sensor in or on the machine room, which is separated from the test space in an air-tight manner. The other gas sensor can detect escaping refrigerant in the machine room in the case of a leak of the cooling circuit within the machine room. In this case, too, the ventilation system can be used to suction air out of the machine room only or alternatively out of the test space and the machine room at the same time. A valve box in which the valves of the cooling feature or the cooling circuit are integrated can be disposed in the machine room. The valve box can be open toward the machine room to ensure that refrigerant can leave the valve box if a leak is present in this location. This leak can also be detected by means of the other gas sensor. The other gas sensor, i.e., the gas sensor in the machine room, can preferably be disposed at a bottom of the machine room. In this manner, leaking refrigerant, i.e., hydrocarbon, which is heavier than air, can sink to the bottom and be reliably detected there. Potential ventilation openings in the machine room or a housing of the test chamber can be disposed above the bottom, for example, 10 cm above the bottom, of the machine room, so that leaking refrigerant cannot leave the machine room undetected.

The refrigerant can be free from fluorinated hydrocarbons, can be flammable and/or can be a refrigerant consisting of a single substance. For example, the refrigerant can be propane, ethane, ethylene, propene, isobutane, butane or the like. The refrigerant can also be a refrigerant mixture of hydrocarbons, i.e., the components mentioned above, or a refrigerant mixture with mainly hydrocarbons. Furthermore, the refrigerant can be free from fluorinated hydrocarbons. This makes it possible to comply with future regulative requirements posed on the refrigerant and to avoid the disadvantages of fluorinated hydrocarbons. Also, the refrigerant can be suitable for establishing a temperature in a temperature range of −40° C. to +180° C., preferably −70° C. to +180° C., particularly preferably up to −85° C. to +200° C., within the test space.

The temperature control device can be configured to establish a temperature in a temperature range of −80° C. to +180° C., preferably −100° C. to +200° C., within the test space.

In the method according to the invention for operating a test chamber for conditioning air, in particular a temperature control chamber, a climate chamber or the like, the test chamber has a temperature-insulated test space, which can be sealed from an environment and serves to hold test material, the test space being temperature-controlled using a temperature control device of the test chamber, the temperature control device being used to establish a temperature in a temperature range of −50° C. to +180° C. within the test space, the temperature control device comprising a heating feature and a cooling feature with a cooling circuit with a refrigerant, a heat exchanger in the test space, a compressor, a condenser and an expansion member, the refrigerant being a hydrocarbon or a refrigerant mixture of hydrocarbons, the test chamber being provided with a machine room physically separated from the test space, the cooling circuit with the compressor being at least partially disposed in the machine room, wherein refrigerant in the test space is detected using at least one gas sensor of a detector of a ventilation system of the test chamber, a fan of the ventilation system being used to transport air from the test space into an exhaust duct of the ventilation system, the exhaust duct being connected to the test space, the fan comprising a fan motor and a fan impeller, the fan motor being disposed in an air-tight enclosure. Regarding the advantageous effects of the method according to the invention, reference is made to the description of advantages of the test chamber according to claim 1 as per the invention.

In the alternative method for operating a test chamber for conditioning air, in particular a temperature control chamber, a climate chamber or the like, the test chamber has a temperature-insulated test space, which can be sealed from an environment and serves to hold test material, the test space being temperature-controlled using a temperature control device of the test chamber, the temperature control device being used to establish a temperature in a temperature range of −50° C. to +180° C. within the test space, the temperature control device having a heating feature and a cooling feature with a cooling circuit with a refrigerant, a heat exchanger in the test space, a compressor, a condenser and an expansion member, the refrigerant being a hydrocarbon or a refrigerant mixture of hydrocarbons, the test chamber being provided with a machine room physically separated from the test space, the cooling circuit with the compressor being at least partially disposed in the machine room, wherein refrigerant in the test space is detected using at least one gas sensor of a detector of a ventilation system of the test chamber, a fan of the ventilation system being used to transport air from the machine room and the test space into an exhaust duct of the ventilation system, the exhaust duct being connected to the test space and the machine room. Regarding the advantageous effects of the method according to the invention, reference is made to the description of advantages of the test chamber according to claim 7 as per the invention.

Furthermore, the ventilation system can be operated by means of a control device of the test chamber when the detector detects refrigerant. The test chamber can have the control device for an open-loop and closed-loop control of modules of the test chamber, such as the temperature control device, the heating feature and the cooling feature, etc. For instance, the ventilation system can also be controlled using this control device. When the detector detects refrigerant by means of the gas sensor, the control device can switch the ventilation system on immediately after the detection of refrigerant and thus prompt a suctioning of air out of at least the test space and/or the machine room. Optionally, the gas sensor can also be used to detect the amount of refrigerant in the air. In this case, the ventilation system does not have to be switched on until the real danger of the formation of an explosive mixture occurs. Moreover, the control device can be used for switching the temperature control device with the heating feature and the cooling feature off when refrigerant is detected. In this manner, a continued escape of refrigerant from the cooling circuit and/or an ignition of refrigerant within the test space with the heating feature can be prevented. Also, the control device can be configured to signal a malfunction when refrigerant is detected. For example, an operator can be alerted to the malfunction by sound signals and/or light signals.

The control device of the test chamber can be used to test the function of the ventilation system before the temperature control device can be put into operation. For example, the function of the ventilation system can be tested by putting the fan of the ventilation system in operation in such a manner that the test space and/or the machine room is/are ventilated first. In this manner, it can be ensured that air from an environment of the test chamber is located in the test space or the machine room when the temperature control device is turned on. Any gasses or the like located there beforehand can be removed using the ventilation system. Thereafter, an operator can safely access the test space for work on the test material or for loading the test space with test material, for example.

Moreover, at least one sensor by means of which air movement in the exhaust duct can be detected can be provided in the exhaust duct or in each of a first duct section, a second duct section and/or another duct section of the exhaust duct. For example, the sensor can be a simple paddle switch. At least, this allows performing a simple function test of the ventilation system. When the test chamber is turned on, the function of the ventilation system can be tested first before a main switch or a relay supplies the other modules of the test chamber or the temperature control device with electrical energy. Likewise, the control device can cause an emergency shutdown of the test chamber and the other modules when the gas sensor detects refrigerant and the ventilation system is put into operation.

Other advantageous embodiments of the method are apparent from the description of features of the dependent claims referring to device claims 1 and 7.

Hereinafter, preferred embodiments of the invention will be discussed in more detail with reference to the accompanying drawings.

Figure 1:
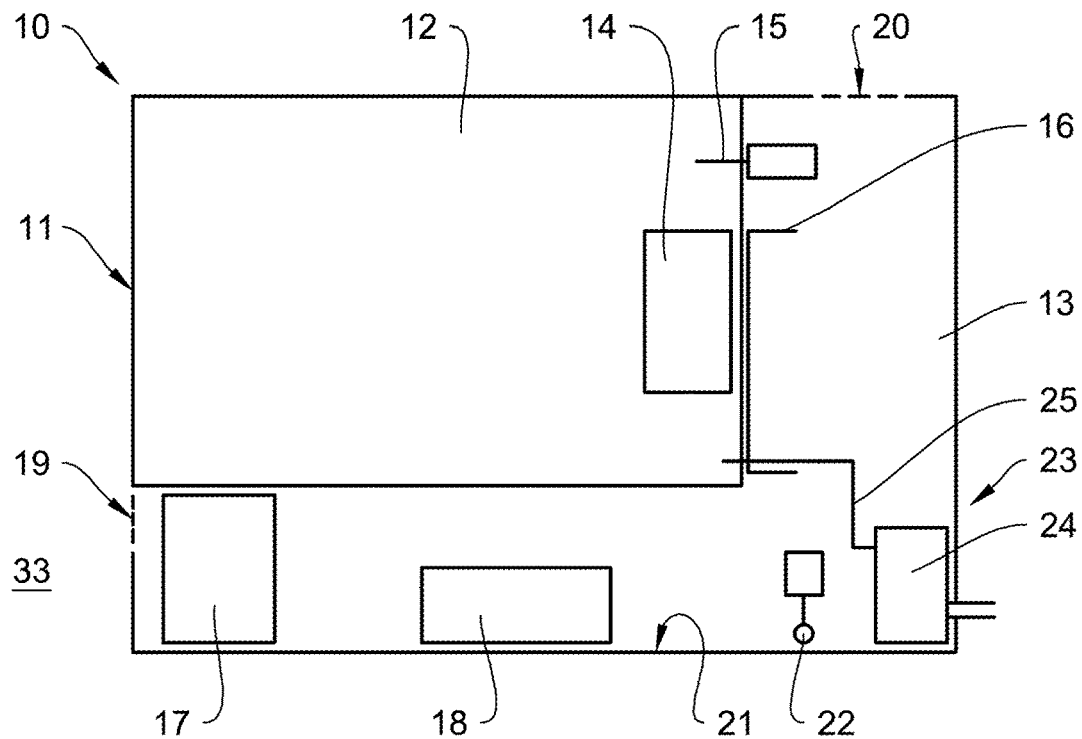
FIG. 1 is a schematic illustration of a test chamber in a section view.
Figure 2:
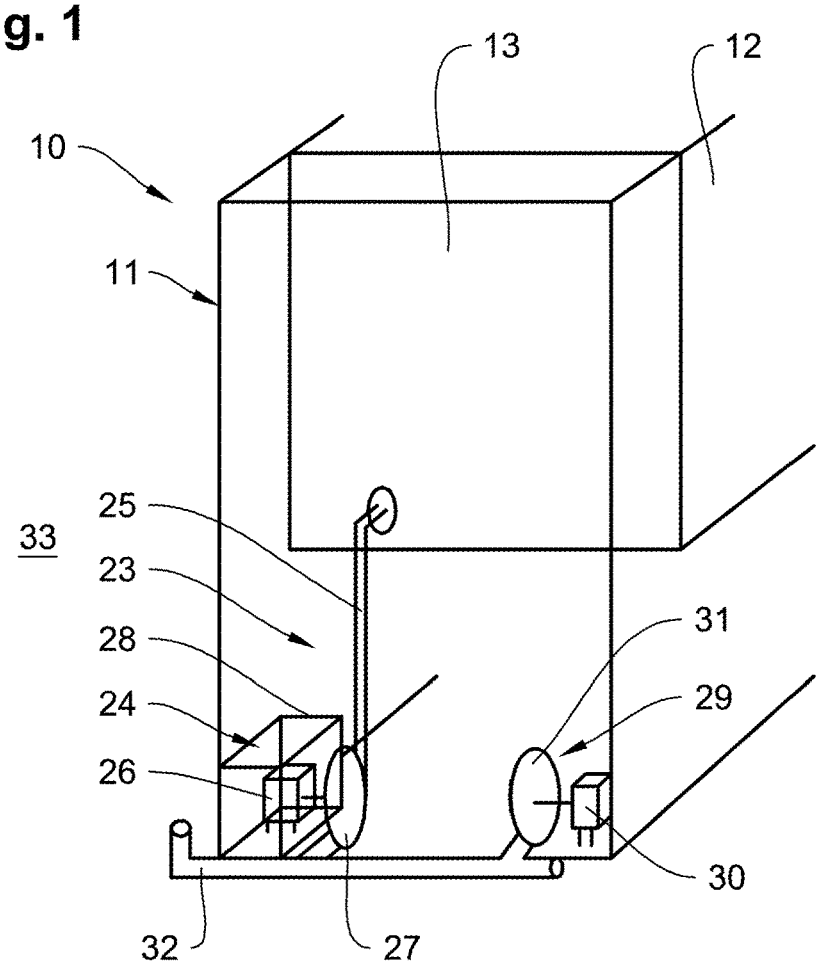
FIG. 2 is a schematic illustration of the test chamber in a perspective partial view.

FIGS. 1 and 2 show schematic illustrations of a test chamber 10 with a housing 11, within which a test space 12 and a machine room 13 are formed. A heat exchanger 14 of a cooling circuit (not shown) of a temperature control device of test chamber 10 is disposed in test space 12. A test space fan 15 can be used to circulate air within test space 12 past heat exchanger 14. A valve box 16, in which valves (not shown) of the cooling circuit are integrated, is disposed in machine room 13. Valve box 16 is open toward machine room 13. Furthermore, a condenser 17 and a compressor 18 of the cooling circuit are disposed in machine room 13. Openings 19 and 20 for ventilating machine room 13 are formed in machine room 13. A gas sensor 22 of a detector (not shown) is disposed at a bottom 21 of machine room 13. Moreover, a ventilation system 23 is provided in machine room 13. Ventilation system 23 comprises a fan 24 and an exhaust duct 25, which is connected to test space 12. Fan 24 can transport air from test space 12 into exhaust duct 25 when refrigerant, in particular a hydrocarbon or a refrigerant mixture of hydrocarbons, is detected in test space 12 or in machine room 13 by a gas sensor (not shown) in or on test space 12 or by gas sensor 22.

Fan 24 comprises a fan motor 26 and a fan impeller 27, fan motor 26 being disposed in an air-tight enclosure 28. Enclosure 28 is made of sheet metal and disposed within machine room 13. According to the illustration in FIG. 2, ventilation system 23 can comprise another fan 29, which is composed of a fan motor 30 and a fan impeller 31. Fan 29 allows ventilating machine room 13. Fan motor 26 can be a conventional fan motor, which does not have to be configured for operation in explosive atmospheres. Fan 29, on the other hand, is intended for use in explosive atmospheres. Fan 24 and fan 29 are connected to a common duct section 32 of exhaust duct 25. In the case at hand, common duct section 32 runs outside of housing 11 in an environment 33. As a result, a potential explosive mixture of refrigerant and air is located outside of housing 11.

Figure 3:
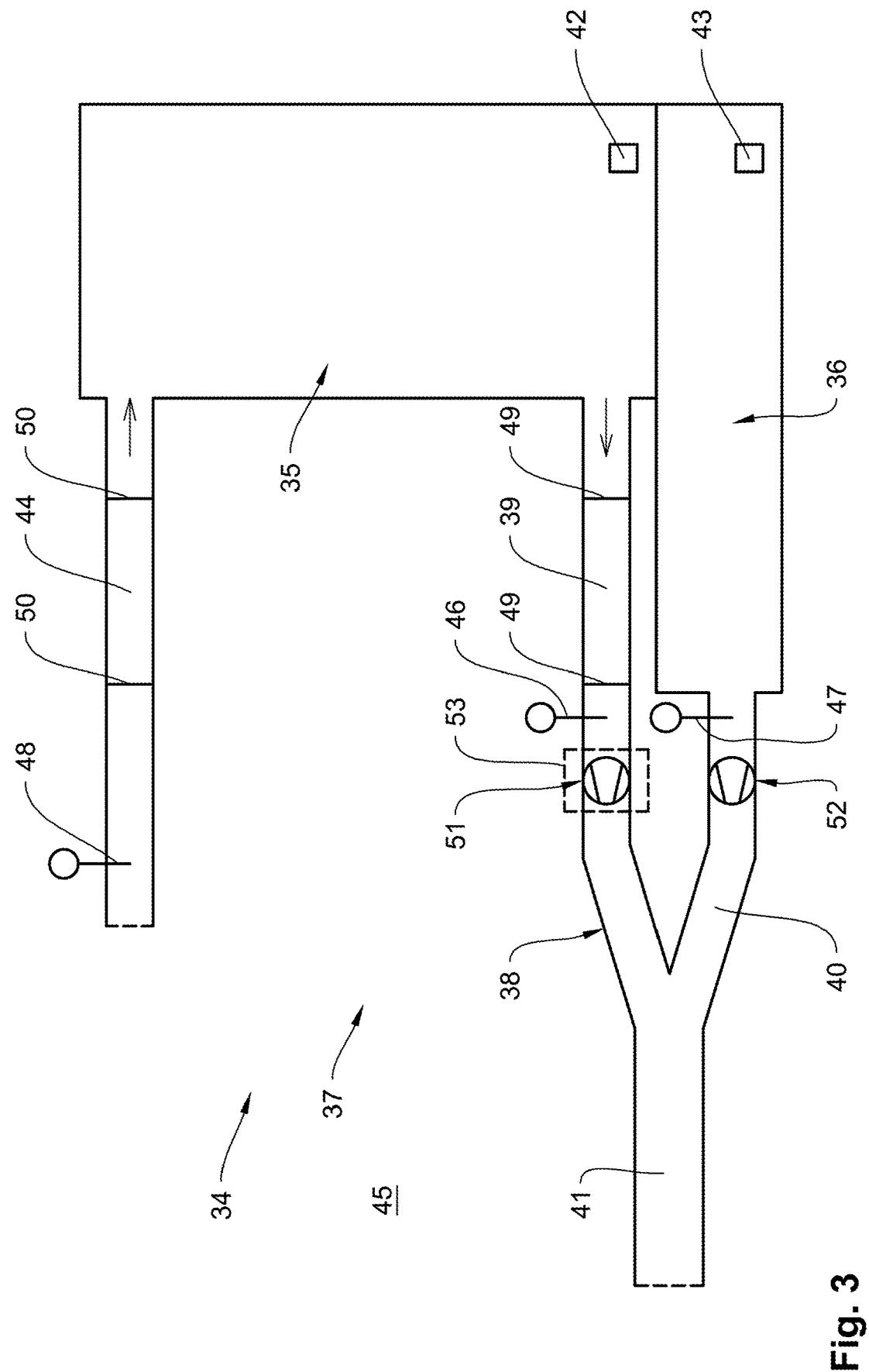
FIG. 3 is a schematic diagram of an embodiment of the test chamber.

FIG. 3 shows a test chamber 34, which has a test space 35 and a machine room 36. Test chamber 34 is provided with a ventilation system 37, which has an exhaust duct 38 with a first duct section 39, a second duct section 40 and a common duct section 41. Furthermore, a gas sensor 42 is disposed in test space 35 and another gas sensor 43 is disposed in machine room 36. Gas sensor 42 can also be disposed outside test space 35 and can be connected to test space 35 via a duct, for example. Moreover, an air supply duct 44 is provided, via which air from an environment 45 can be introduced into test space 35. Sensors 46, 47 and 48 are disposed in first duct section 39, second duct section 40 and air supply duct 44, respectively. Sensors 46, 47 and 48 are flow sensors and/or temperature sensors, which can measure a volumetric flow rate and/or a temperature of the air located there. Flaps 49, which can be operated by a difference in pressure, are disposed in first duct section 39, and flaps 50, which can be operated in the same manner, are disposed in air supply duct 44. A fan 51 is disposed in first duct section 39, and another fan 52 is disposed in second duct section 40. Fan 51 has an enclosure 53, which shields a fan motor (not shown) in an air-tight manner.

In the event of a leak of a cooling circuit (not shown) and an escape of refrigerant, which is a hydrocarbon or a refrigerant mixture of hydrocarbons, in test space 35 or machine room 36, gas sensors 42 and 43 can detect this refrigerant. In this case, a control device (not shown) of test chamber 34 activates ventilation system 37, i.e., fan 51 and fan 52. A controller (not shown) of the control device can monitor a function of fans 51 and 52 via sensors 46, 47 and/or 48. A function test of this kind can be performed in particular before a temperature control device of test chamber 34 is put into operation. Fan 51 and fan 52 can also be operated independently. In any case, first duct section 39 and second duct section 40 end in common duct section 41. Common duct section 41, in turn, leads to environment 45. Flaps 49 and 50 can be made of silicone and be operable by a difference in pressure. Test space 35 is closed by flaps 49 and 50 when fan 51 is not operational. Fan 51 can be a conventional fan which is not explicitly configured for use in explosive atmospheres. Fan 52 is configured for use in explosive atmospheres.

Figure 4:
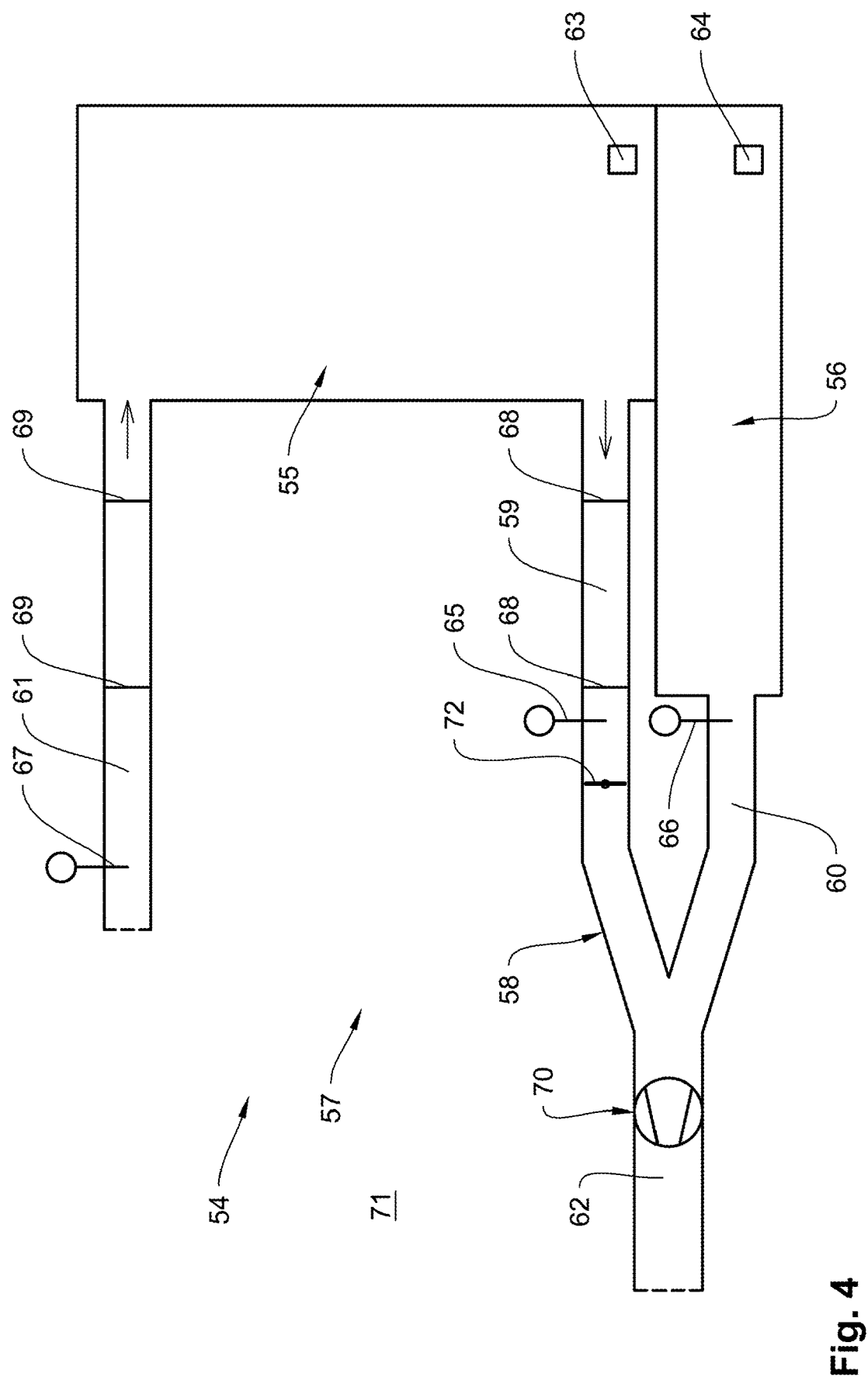
FIG. 4 is a schematic diagram of another embodiment of the test chamber.

FIG. 4 shows a test chamber 54 having a test space 55, a machine room 56 and a ventilation system 57. Ventilation system 57 comprises an exhaust duct 58 with a first duct section 59, a second duct section 60 and an air supply duct 61. First duct section 59 and air supply duct 61 are connected to test space 55. Second duct section 60 is connected to machine room 56. First duct section 59 and second duct section 60 end in a common duct section 62 of exhaust duct 58. A gas sensor 63 is disposed in test space 55, and another gas sensor 64 is disposed in machine room 56, gas sensors 63 and 64 serving to detect refrigerant, in particular a hydrocarbon or a refrigerant mixture of hydrocarbons. Moreover, sensors 65, 66, and 67 are disposed in first duct section 59, second duct section 60 and air supply duct 61, sensors 65, 66, and 67 serving to detect a temperature and/or an air flow or a volumetric flow rate within duct sections 59 and 60 and air supply duct 61. Moreover, flaps 68 and 69, which can be made of silicone, for example, and by means of which test space 55 can be closed, are disposed in first duct section 59 and in air supply duct 61, respectively. Flaps 68 and 69 can be configured to automatically open as a result of a pressure gradient.

A fan 70, by means of which air can be transported or suctioned out of test space 55 and machine room 56, is disposed in common duct section 62. In particular, make-up air from an environment 71 can flow through air supply duct 61. The aspirated air is expelled back into environment 71 by fan 70 via common duct section 62. A ratio of the air suctioned out of test space 55 and machine room 56 is set or controlled by means of an adjustment valve 72, which is disposed in first duct section 59. Adjustment valve 72 is controlled by a controller (not shown) of a control device (not shown) of test chamber 54. This control takes place with the aid of at least sensors 65 and 66. A temperature and optionally a volumetric flow rate of the air to be transported is measured in first duct section 59 and second duct section 60 and mixed in such a manner by means of adjustment valve 72 upstream of fan 70 that a temperature at fan 70 does not exceed or drop below a temperature range for which fan 70 is configured. Fan 70 is configured for use in explosive atmospheres, for example, for a temperature range of +60° C. to −20° C. The configuration of ventilation system 57 in the manner illustrated is what enables the use of fan 70.

The invention claimed is:

1. A test chamber for conditioning air, the test chamber comprising:
    a temperature-insulated test space configured to be sealable from an environment and to hold a test material, and
    a temperature control device configured to control temperature of the temperature-insulated test space and to establish said temperature in a temperature range from −50° C. to +180° C. within the temperature-insulated test space, the temperature control device having a heating feature and a cooling feature with a cooling circuit containing a refrigerant that includes a hydrocarbon or a refrigerant mixture of hydrocarbons, a heat exchanger in the test space, a compressor, a condenser, and an expansion member,
    wherein the test chamber is provided with a machine room physically separated from the temperature-insulated test space, the cooling circuit with the compressor being at least partially disposed in the machine room,
    wherein the test chamber comprises a ventilation system having a detector with at least one gas sensor for detecting configured to detect the refrigerant in the temperature-insulated test space, the ventilation system comprising a fan and an exhaust duct, the exhaust duct being connected to the temperature-insulated test space in such a manner that the fan can transport air from the temperature-insulated test space into the exhaust duct,
    wherein the fan comprises a fan motor and a fan impeller, the fan motor being disposed in an air-tight enclosure.

2. The test chamber according to claim 1, wherein the air-tight enclosure is made of a metal or sheet metal and separates the fan motor (26) at least from the exhaust duct, the test space, and/or the machine room in an air-tight manner.

3. The test chamber according to claim 1, wherein
an exhaust air temperature in the exhaust duct approximately corresponds to the temperature within the test space.

4. The test chamber according to claim 1, wherein the exhaust duct is connected to the temperature-insulated test space via a first duct section of the exhaust duct and to the machine room via a second duct section of the exhaust duct,
wherein the fan is disposed in the first duct section, and an auxiliary fan of the ventilation system is disposed in the second duct section.

5. The test chamber according to claim 4, wherein
the first duct section and the second duct section end in a common duct section of the exhaust duct.

6. The test chamber according to claim 4, wherein
the auxiliary fan is configured for use in an explosive atmosphere according to the ATEX equipment directive 2014/34/EU and/or the ATEX workplace directive 1999/92/EC.

7. A test chamber for conditioning air, the test chamber comprising:
a temperature-insulated test space configured to be sealable from an environment and to hold test material, and
a temperature control device configured to control temperature of the temperature-insulated test space and to establish said temperature in a temperature range from −50° C. to +180° C. within the temperature-insulated test space, the temperature control device having a heating feature and a cooling feature with a cooling circuit with a refrigerant that includes a hydrocarbon or a refrigerant mixture of hydrocarbons, a heat exchanger in the temperature-insulated test space, a compressor, a condenser, and an expansion member,
wherein the test chamber is provided with a machine room physically separated from the temperature-insulated test space,
wherein the cooling circuit with the compressor is at least partially disposed in the machine room,
wherein the test chamber comprises a ventilation system having a detector with at least one gas sensor configured to detect the refrigerant in the temperature-insulated test space, the ventilation system comprises a fan and an exhaust duct that is connected to the test space and the machine room in such a manner that one fan can transport air from the machine room and the temperature-insulated test space into the exhaust duct.

8. The test chamber according to claim 7, wherein
the one fan is configured for use in an explosive atmosphere according to the ATEX equipment directive 2014/34/EU and/or the ATEX workplace directive 1999/92/EC.

9. The test chamber according to claim 7, wherein
the exhaust duct is connected to the temperature-insulated test space via a first duct section of the exhause duct and to the machine room via a second duct section of the exhaust duct, the first duct section and the second duct section ending in a common duct section of the exhaust duct, the one fan being disposed in the common duct section.

10. The test chamber according to claim 7 wherein the exhaust duct is connected to the temperature-insulated test space via a first duct section of the exhaust duct and the ventilation system has an adjustment valve disposed in the first duct section.

11. The test chamber according to claim 7, wherein the exhaust duct is connected to the temperature-insulated test space via a first duct section of the exhaust duct and to the machine room via a second duct section of the exhaust duct, and the ventilation system has at least one sensor disposed in the first duct section, the second duct section, and/or an air supply duct of the ventilation system,
wherein the air supply duct is connected to the temperature-insulated test space and the at least one sensor is a flow sensor and/or a temperature sensor.

12. The test chamber according to claim 7, wherein the exhaust duct is connected to the temperature-insulated test space via a first duct section of the exhaust duct and to the machine room via a second duct section of the exhaust duct, the first duct section and the second duct section ending in a common duct section of the exhaust duct, and wherein the test chamber has a controller configured to control an exhaust air temperature in the common duct section in a temperature range from −20° C. to +60° C.

13. The test chamber according to claim 1, wherein the fan is disposed within the machine room.

14. The test chamber according to claim 1, wherein the ventilation system has an air supply duct connected to the temperature-insulated test space, and wherein at least one valve is disposed both in the air supply duct and in the exhaust duct.

15. The test chamber according to claim 14, wherein
the at least one valve includes at least one flap operable by a difference in pressure.

16. The test chamber according to claim 1, wherein the detector comprises at least one auxiliary gas sensor in the machine room, the machine room being separated from the test space in an air-tight manner.

17. The test chamber according to claim 1, wherein the refrigerant is free from fluorinated hydrocarbons, is flammable, and/or consists of a single substance.

18. The test chamber according to claim 1, wherein the temperature control device is configured to establish said temperature in a temperature range from −80° C. to +180° C. within the temperature-controlled test space.

19. A method for operating a test chamber having a temperature-insulated test space that is configured to be sealed from an environment and to hold a test material, the temperature-controlled test space being temperature-controlled with a temperature control device of the test chamber, the temperature control device being used to establish a temperature in a temperature range −50° C. to +180° C. within the temperature-controlled test space,
wherein the temperature control device has a heating feature and a cooling feature with a cooling circuit with a refrigerant, a heat exchanger in the temperature-controlled test space, a compressor, a condenser, and an expansion member, wherein the refrigerant is a hydrocarbon or a refrigerant mixture of hydrocarbons, the test chamber is provided with a machine room physically separated from the temperature-controlled test space, and wherein the cooling circuit with the compressor is at least partially disposed in the machine room,
the method comprising:
detecting said refrigerant in the temperature-controlled test space using at least one gas sensor of a detector of a ventilation system of the test chamber, and
transporting air from the temperature-controlled test space into an exhaust duct of the ventilation system with a fan of the ventilation, wherein the exhaust duct is connected to the temperature-controlled test space wherein the fan comprises a fan motor that is disposed in an air-tight enclosure, and a fan impeller.

20. A method for operating a test chamber for conditioning air, the test chamber having a temperature-insulated test space configured to be sealable, from an environment and to hold test material, the temperature-controlled test space being temperature-controlled using a temperature control device of the test chamber, the temperature control device being configured to establish a temperature in a temperature range from −50° C. to +180° C. within the temperature-controlled test space, wherein the temperature control device has a heating feature and a cooling feature with a cooling circuit with a refrigerant, a heat exchanger in the test space, a compressor, a condenser, and an expansion member, wherein the refrigerant includes a hydrocarbon or a refrigerant mixture of hydrocarbons, the test chamber is provided with a machine room physically separated from the temperature-controlled test space, and the cooling circuit with the compressor is at least partially disposed in the machine room, the method comprising:

detecting said refrigerant in the temperature-controlled test space using at least one gas sensor of a detector of a ventilation system of the test chamber, and transporting air from the machine room and the temperature-controlled test space into an exhaust duct of the ventilation system with a fan of the ventilation system, wherein the exhaust duct is connected to the temperature-controlled test space and the machine room.

21. The method according to claim 19, further comprising operating the ventilation system with a controller of the test chamber when the detector detects refrigerant.

22. The method according to claim 19, further comprising with a control device of the test chamber, testing a function of the ventilation system before the temperature control device is put into operation.

* * * * *

UNITED STATES PATENT AND TRADEMARK OFFICE
CERTIFICATE OF CORRECTION

| | | |
|---|---|---|
| PATENT NO. | : 12,399,093 B2 | Page 1 of 1 |
| APPLICATION NO. | : 18/139728 | |
| DATED | : August 26, 2025 | |
| INVENTOR(S) | : Yannik Zahrt et al. | |

It is certified that error appears in the above-identified patent and that said Letters Patent is hereby corrected as shown below:

In the Claims

Column 10, Claim 1, Lines 54-55, "sensor for detecting configured" should be --sensor configured--.

Column 11, Claim 7, Line 23, "hold test material" should be --hold a test material--.

Column 11, Claim 9, Line 54, "exhause" should be --exhaust--.

Column 13, Claim 20, Line 4, "hold test material" should be --hold a test material--.

Signed and Sealed this
Twenty-eighth Day of October, 2025

John A. Squires
*Director of the United States Patent and Trademark Office*